US006338938B1

(12) United States Patent
Lahaug

(10) Patent No.: US 6,338,938 B1
(45) **Date of Patent: *Jan. 15, 2002**

(54) METHODS OF FORMING SEMICONDUCTOR DEVICES AND METHODS OF FORMING FIELD EMISSION DISPLAYS

(75) Inventor: Eric A. Lahaug, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/490,934

(22) Filed: Jan. 25, 2000

Related U.S. Application Data

(63) Continuation of application No. 09/145,488, filed on Sep. 1, 1998, now Pat. No. 6,037,104.

(51) Int. Cl.[7] .................................................. C03C 5/00

(52) U.S. Cl. .......................... 430/314; 216/11; 216/42; 216/49; 216/51; 216/67; 445/24; 445/50

(58) Field of Search ........................... 430/314; 445/24, 445/50; 216/11, 42, 49, 51, 67

(56) References Cited

U.S. PATENT DOCUMENTS

| | | | | | |
|---|---|---|---|---|---|
| 4,407,695 | A | | 10/1983 | Deckman et al. | 156/643 |
| 5,151,061 | A | | 9/1992 | Sandhu | 445/24 |
| 5,186,670 | A | | 2/1993 | Doan et al. | 445/24 |
| 5,210,472 | A | | 5/1993 | Casper et al. | 315/349 |
| 5,220,725 | A | | 6/1993 | Chan et al. | 29/874 |
| 5,245,248 | A | | 9/1993 | Chan et al. | 313/309 |
| 5,391,259 | A | | 2/1995 | Cathey et al. | 156/643 |
| 5,399,238 | A | | 3/1995 | Kumar | 156/643 |
| 5,510,156 | A | | 4/1996 | Zhao | 427/534 |
| 5,660,570 | A | | 8/1997 | Chan et al. | 439/886 |
| 5,676,853 | A | | 10/1997 | Alwan | 216/11 |
| 6,037,104 | A | * | 3/2000 | Lahaug | 430/314 |

OTHER PUBLICATIONS

K. Kim et al., "Generation of Charged Liquid Cluster Beam of Liquid–Mix Precursors and Application to Nanostructured Materials", May 1994, pp. 597–602.

* cited by examiner

*Primary Examiner*—Christopher G. Young
(74) *Attorney, Agent, or Firm*—Wells, St. John, Roberts, Gregory & Matkin, P.S.

(57) ABSTRACT

In one aspect the invention includes a method of forming a semiconductor device, comprising: a) forming a layer over a substrate; b) forming a plurality of openings extending into the layer; c) depositing particles on the layer; d) collecting the particles within the openings; and e) using the collected particles as a mask during etching of the underlying substrate to define features of the semiconductor device. In another aspect, the invention includes a method of forming a field emission display, comprising: a) forming a silicon dioxide layer over a conductive substrate; b) forming a plurality of openings extending into the silicon dioxide layer; c) depositing particles on the silicon dioxide layer; d) collecting the particles within the openings; e) while using the collected particles as a mask, etching the conductive substrate to form a plurality of conically shaped emitters from the conductive substrate; and f) forming a display screen spaced from said emitters.

24 Claims, 5 Drawing Sheets

METHODS OF FORMING SEMICONDUCTOR DEVICES AND METHODS OF FORMING FIELD EMISSION DISPLAYS

RELATED PATENT DATA

This patent is a continuation application of U.S. patent application Ser. No. 09/145,488 which was filed on Sep. 1, 1998, now U.S. Pat. No. 6,037,104.

TECHNICAL FIELD

The invention pertains to methods of forming semiconductor devices, and in one aspect pertains to methods of forming field emission displays.

BACKGROUND OF THE INVENTION

Field emitters are widely used in display devices, such as, for example, flat panel displays. Clarity, or resolution, of a field emission 11 display is a function of a number of factors, including emitter tip sharpness. Specifically, sharper emitter tips can produce higher resolution displays than less sharp emitter tips. Accordingly, numerous methods have been proposed for fabrication of very sharp emitter tips (i.e., emitter tips having tip radii of 100 nanometers or less). Fabrication of very sharp tips has, however, proved difficult. In light of these difficulties, it would be desirable to develop alternative methods of forming emitter tips.

SUMMARY OF THE INVENTION

In one aspect, the invention encompasses a method of forming a semiconductor device. A layer is formed over a substrate and a plurality of openings are formed extending into the layer. Particles are deposited on the layer and collected in the openings. The collected particles are melted and used as a mask during etching of the underlying substrate to define features of the semiconductor device.

In another aspect, the invention encompasses a method of forming a field emission display. A silicon dioxide layer is formed over a conductive substrate and a plurality of openings are formed to extend into the silicon dioxide layer. Particles are deposited on the silicon dioxide layer and collected within the openings. The collected particles are utilized as a mask during etching of the conductive substrate to form a plurality of conically shaped emitters from the conductive substrate. A display screen is formed spaced from the emitters.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
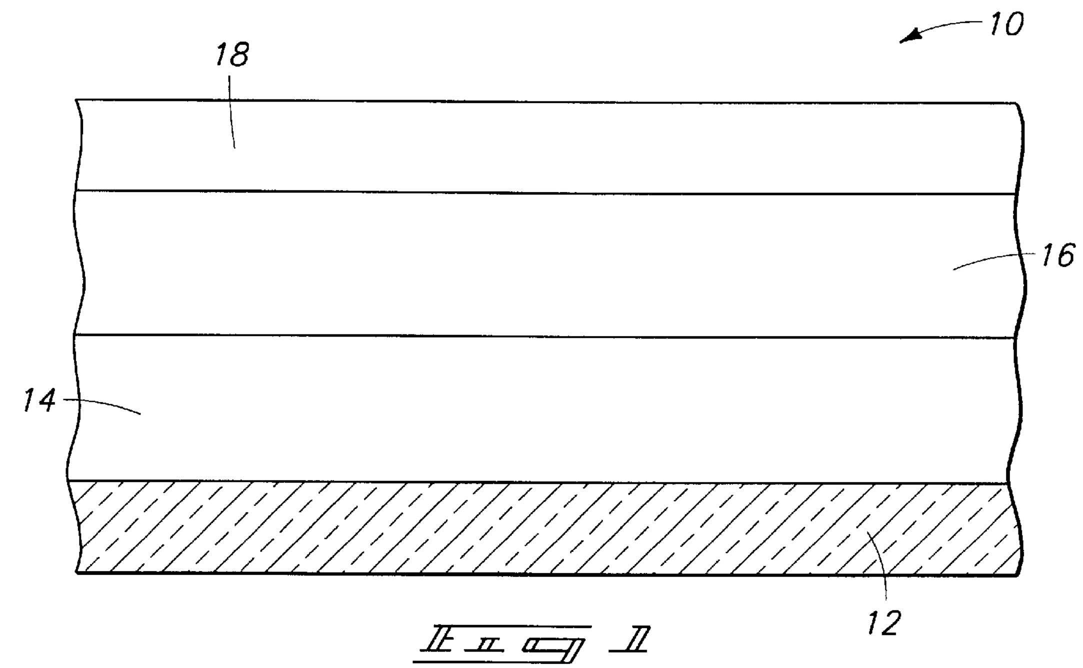
FIG. 1 is a diagrammatic, fragmentary, cross-sectional view of a semiconductor substrate at a preliminary process step of a method of the present invention.

Referring to FIG. 1, a semiconductor substrate 10 is illustrated at a preliminary stage of a processing sequence of the present invention. To aid in interpretation of this disclosure and the claims that follow, the term "semiconductor substrate" is defined to mean any construction comprising semiconductive material, including, but not limited to, bulk semiconductive materials (either alone or in assemblies comprising other materials thereon), and semiconductive material layers (either alone or in assemblies comprising other materials). The term "substrate" refers to any supporting structure, including, but not limited to, the semiconductor substrates described above.

Substrate 10 comprises a glass plate 12, a first semiconductive material layer 14 overlying glass plate 12, a second semiconductive material 16 overlying material 14, and a silicon dioxide layer 18 overlying second semiconductive material layer 16. Semiconductive material 14 can comprise either a p-type doped or an n-type doped semiconductive material, and semiconductive material 16 can comprise doped polysilicon material. Materials 12, 14 and 16 together comprise a conventional emitter tip starting material. Silicon dioxide layer 18 can be formed over layer 16 by, for example, chemical vapor deposition.

Figure 2:
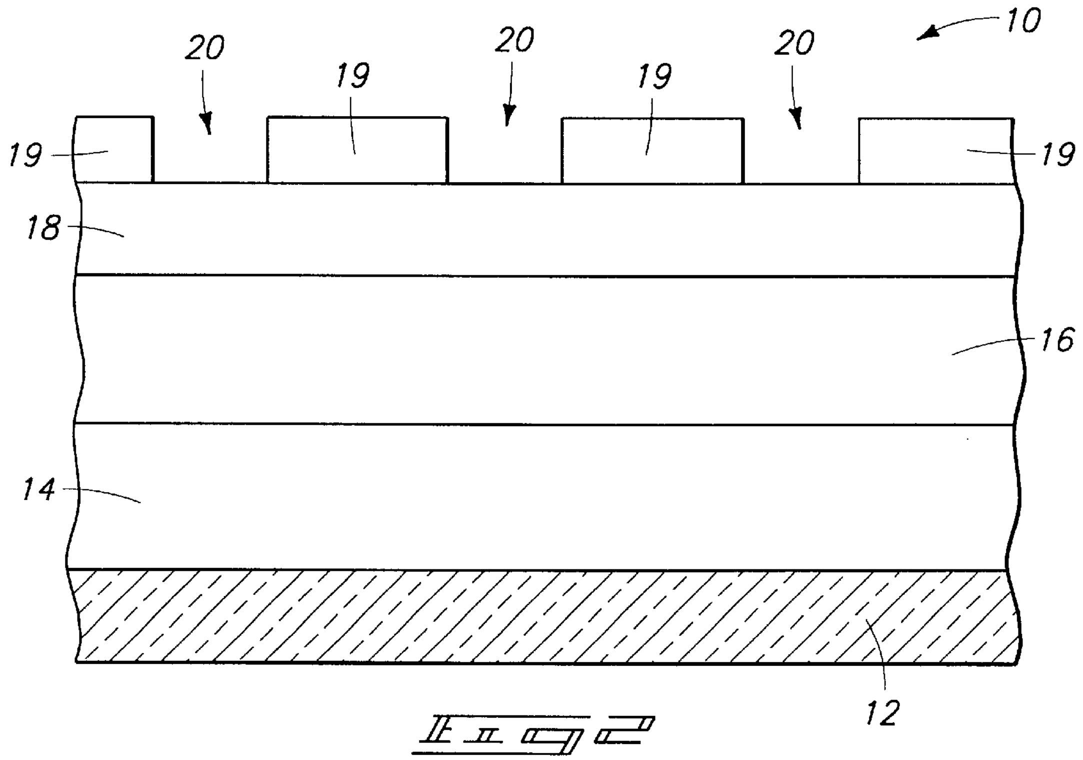
FIG. 2 is a view of the FIG. 1 substrate shown at a processing step subsequent to that of FIG. 1.

Referring to FIG. 2, a patterned masking layer 19 is formed over silicon dioxide layer 18. Patterned masking layer 19 can comprise, for example, photoresist, and can be patterned by a photolithographic process. Patterned photoresist layer 19 has openings 20 extending therethrough to expose portions of silicon dioxide layer 18.

Figure 3:
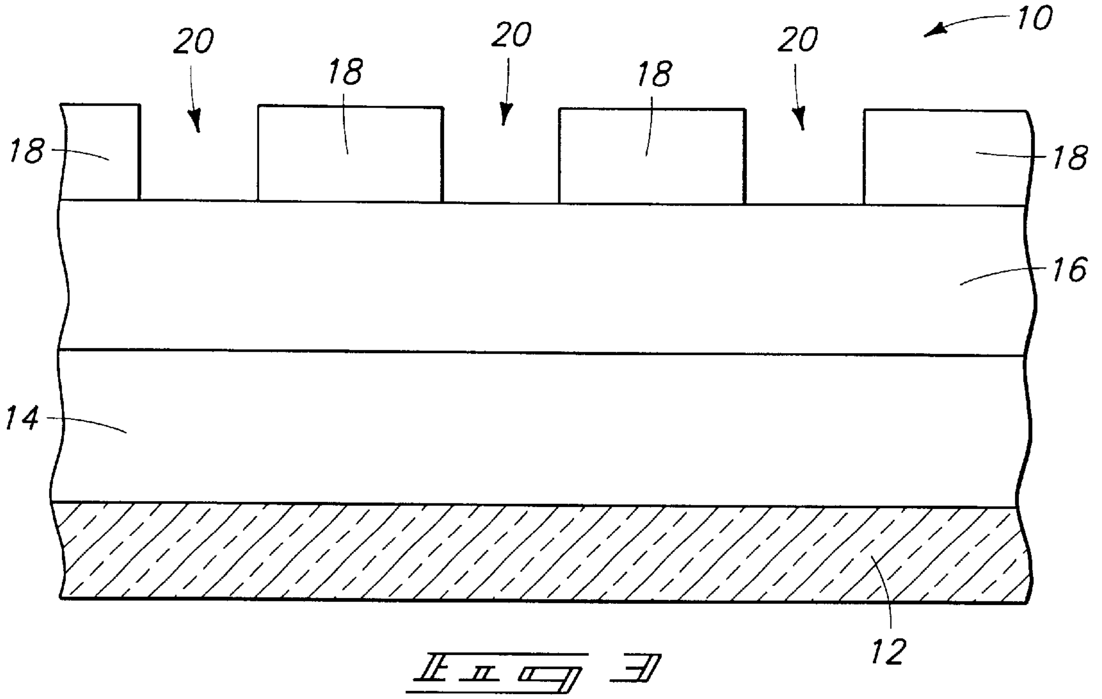
FIG. 3 is a view of the FIG. 1 substrate shown at a processing step subsequent to that of FIG. 2.

Referring to FIG. 3, openings 20 are extended into silicon dioxide layer 18, and subsequently photoresist layer 19 (FIG. 2) is removed. Accordingly, a pattern is transferred from photoresist layer 19 to silicon dioxide layer 18. Openings 20 can be extended into silicon dioxide layer 18 by, for example, a buffered oxide etch.

Figure 4:
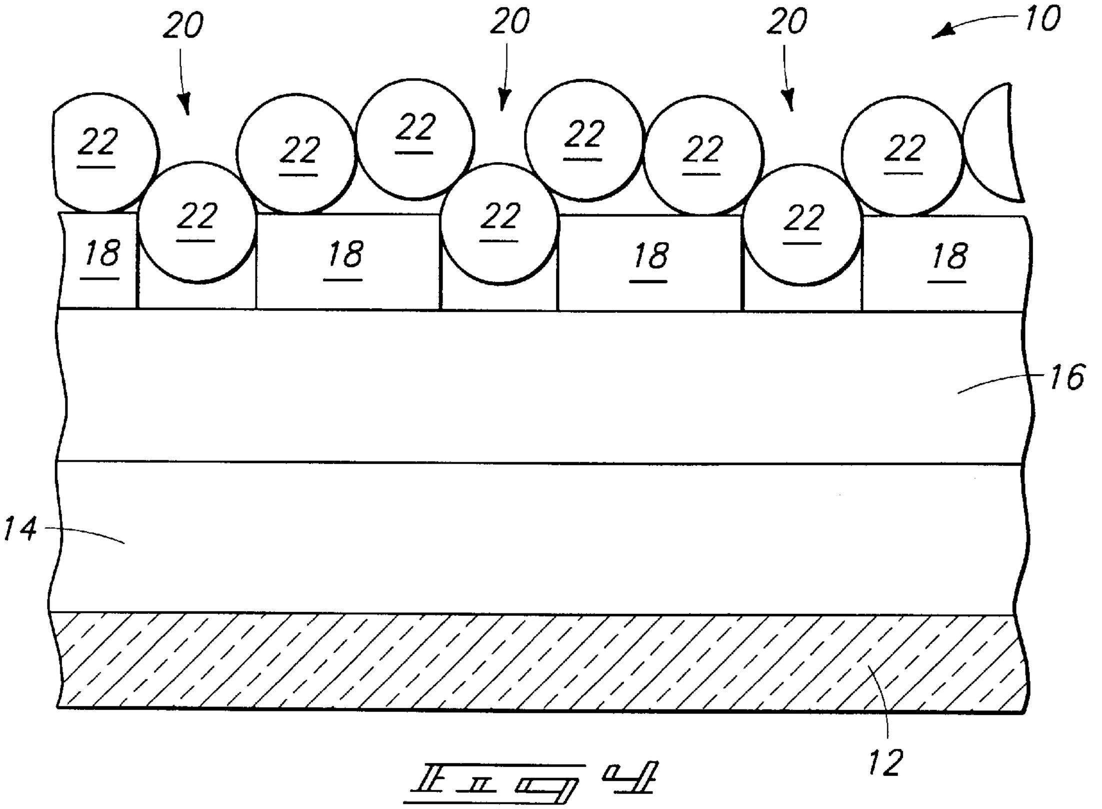
FIG. 4 is a view of the FIG. 1 substrate shown at a processing step subsequent to that of FIG. 3.

Referring to FIG. 4, particles 22 are deposited on silicon dioxide layer 18. Particles 22 can comprise, for example, commercially available microspheres. Such microspheres can be formed of a variety of substances, including polymers such as polystyrene. Microspheres come in a variety of different sizes, with typical sizes being from about 0.01 to about 250 microns in diameter. As used herein, the term "microspheres" refers to small, generally spherical particles of colloidal 11 particle size, and not to any precise geometrical shape. The microspheres may be suspended in a de-ionized water solution or an isopropyl alcohol solution. Suppliers of microspheres include Bangs Laboratories, Inc. of Fishers, Ind. 46038, and Interfacial Dynamics Corp. of Portland, Oreg. 97220. In preferred embodiments of the present invention, particles 22 are microspheres having average diameters of from about 1 to about 2 microns.

Figure 5:
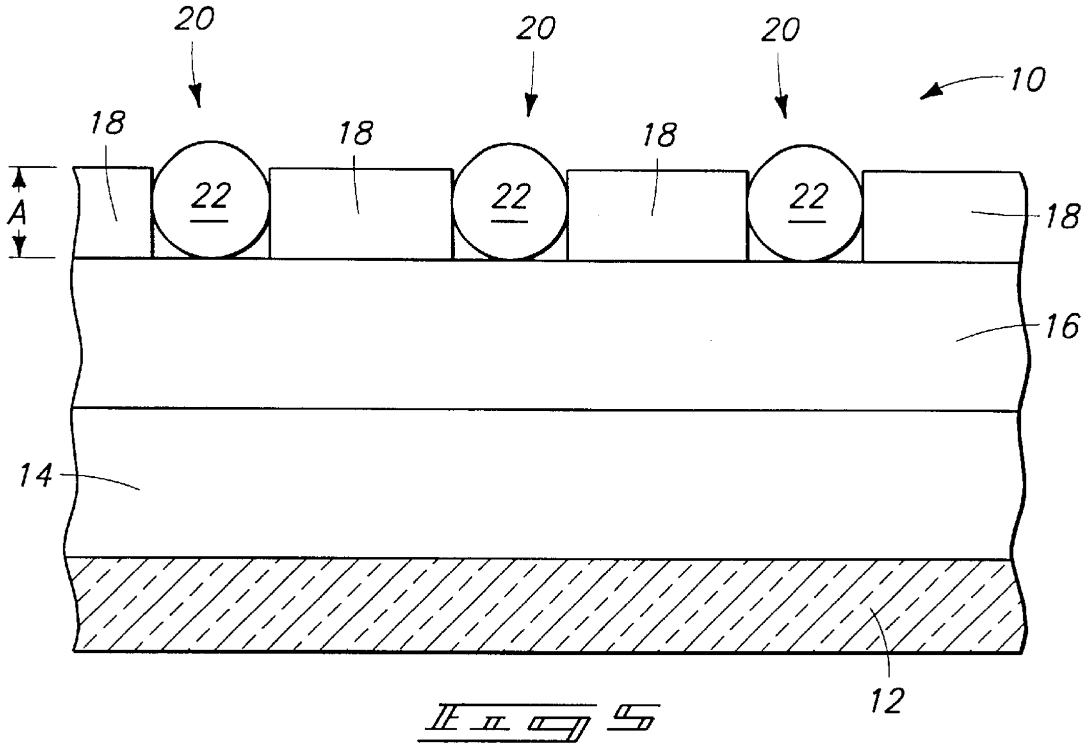
FIG. 5 is a view of the FIG. 1 substrate shown at a processing step subsequent to that of FIG. 4.

Referring to FIG. 5, particles 22 are collected within openings 20 and excess particles 22 are removed. Such collection of particles 22 within openings 20 and removal of excess particles 22 can be accomplished by, for example, mechanically urging particles 22 into openings 20 utilizing a squeegee-type technique. Alternatively, microspheres 22 can be positioned within openings 20 by locating them on structure 18 in the form of a concentrated solution and subsequently rinsing a surface of silicon dioxide layer 18 with a spray to remove excess particles 22 and leave particles 22 within openings 20.

In the shown preferred embodiment, silicon dioxide layer 18 has a thickness "A" which is less than an average dimension of particles 22. For instance, if particles 22 comprise microspheres, thickness "A" is preferably less than an average diameter of microspheres 22. Accordingly, only one microsphere 22 is provided within any given opening 20.

Figure 6:
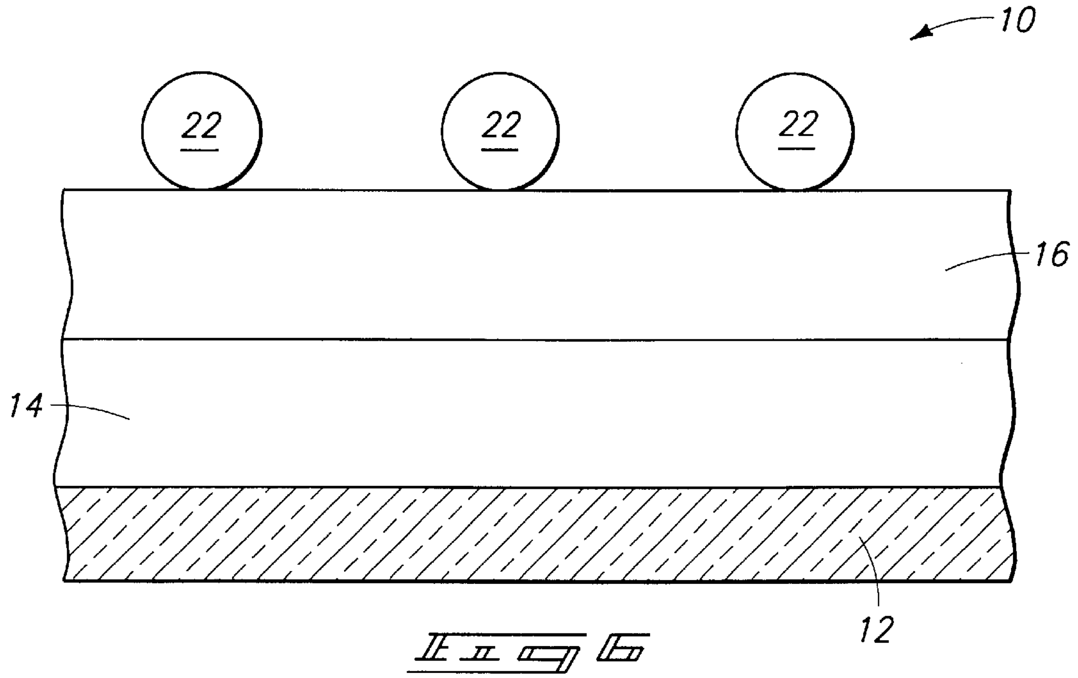
FIG. 6 is a view of the FIG. 1 substrate shown at a processing step subsequent to that of FIG. 5.

Referring to FIG. 6, silicon dioxide layer 18 (FIG. 5) is removed, leaving particles 22 as a masking layer over portions of semiconductive material 16. Silicon dioxide layer 18 is preferably removed with an etch selective for silicon dioxide relative to the silicon material of layer 16. If layer 16 comprises polysilicon, a suitable etch is an oxide etch utilizing at least one of $CF_4$ or $CHF_3$.

As shown, particles 22 remain on polysilicon layer 16 after silicon dioxide layer 18 is removed. A possible mechanism by which particles 22 remain attached to layer 16 is through electrostatic interactions wherein negative charges of the particles interact with positive charges carried by the silicon of layer 16. It is noted, however, that such mechanism is provided herein merely to possibly aid in understanding of the present invention. The invention is to be limited only by the claims that follow, and not to any particular mechanism, except to the extent that such is specifically recited in the claims.

Figure 7:
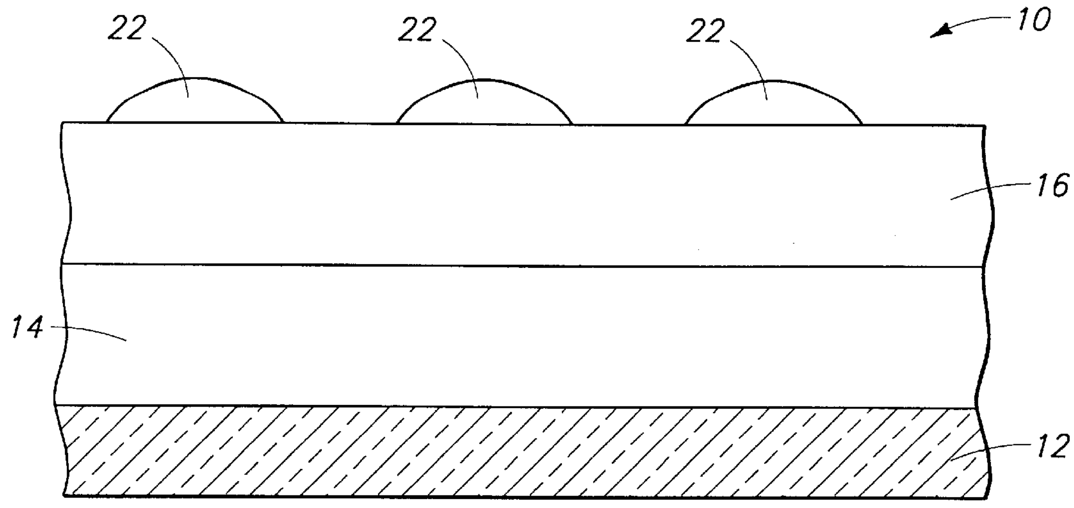
FIG. 7 is a view of the FIG. 1 substrate shown at a processing step subsequent to that of FIG. 6.

Referring to FIG. 7, particles 22 are melted to transform the spherical particles of FIG. 6 to domed discs. An exemplary method for melting particles 22 comprising is to subject the particles to a "soft bake" at a temperature of about 130° C. for a time of about 5 minutes.

Figure 8:
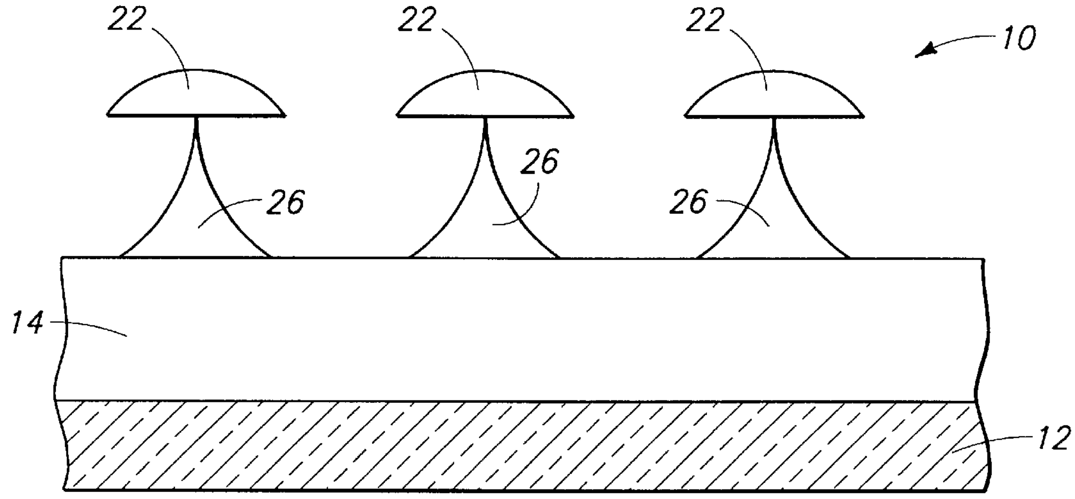
FIG. 8 is a view of the FIG. 1 substrate shown at a processing step subsequent to that of FIG. 7.

Referring to FIG. 8, layer 16 (FIG. 7) is etched while using melted particles 22 as a mask. Such etching forms conically shaped emitters 26 from semiconductive material 16. In embodiments in which semiconductive material 16 comprises polysilicon, the etching can comprise, for example, a silicon dry etch utilizing $SF_6$ and helium.

Figure 9:
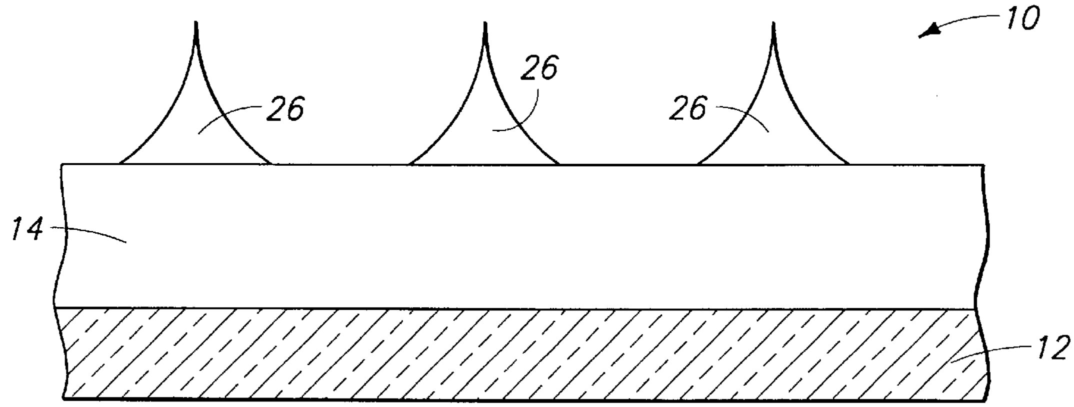
FIG. 9 is a view of the FIG. 1 substrate shown at a processing step subsequent to that of FIG. 8.

Referring to FIG. 9, particles 22 (FIG. 8) are removed. In embodiments in which particles 22 comprise polystyrene, or other organic materials, such removal can comprise, for example, dissolving particles 22 in either an acetone solution, or a piranha (sulfuric acid/hydrogen peroxide) solution.

Figure 10:
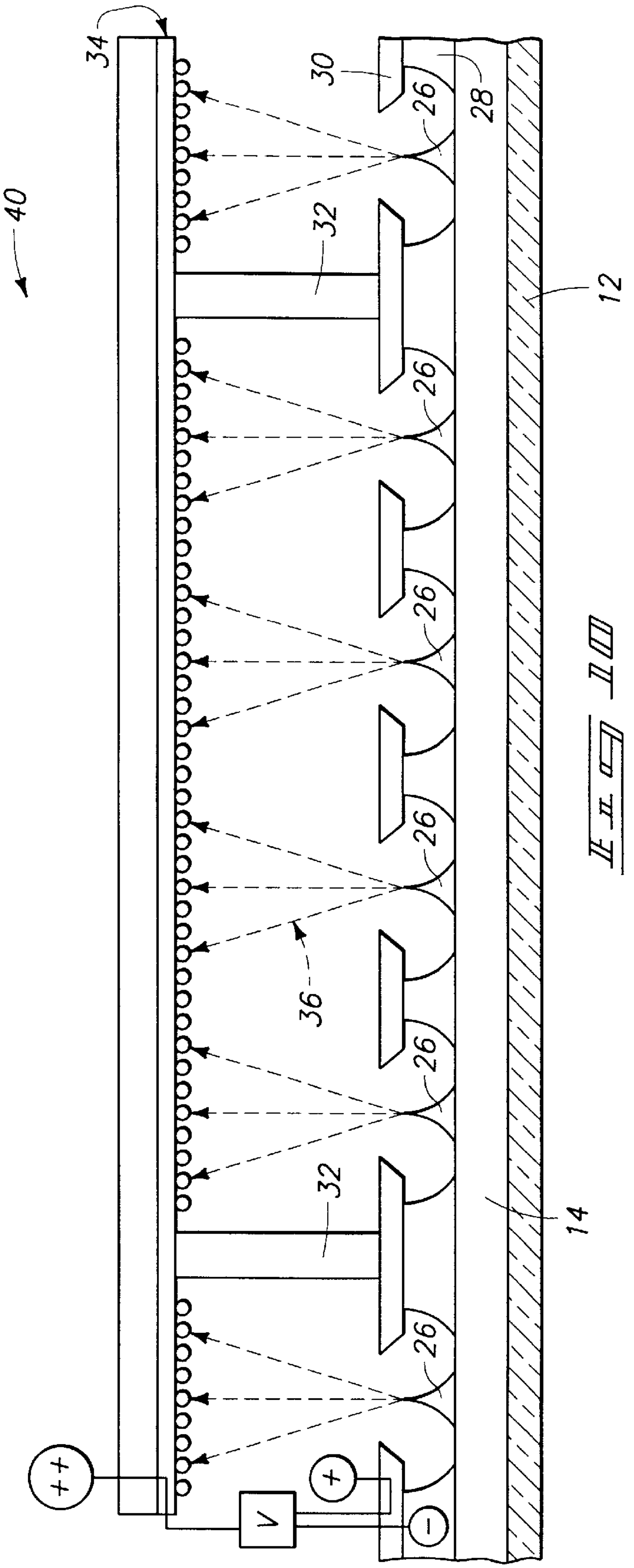
FIG. 10 is a schematic, enlarged cross-sectional view showing one embodiment of a field emission display incorporating emitters shown in FIG. 9.

Referring to FIG. 10, emitters 26 can be incorporated into a field emission display 40. Field emission display 40 includes dielectric regions 28, an extractor 30, spacers 32, and a luminescent screen 34. Techniques for forming field emission displays are described in U.S. Pat. Nos. 5,151,061; 5,186,670; and 5,210,472; hereby expressly incorporated by reference herein. Emitters 26 emit electrons 36 which charge screen 34 and cause images to be seen by a user on an opposite side of screen 34.

The above-described method of the present invention enables positioning of emitters 26 to be carefully controlled during fabrication of emitters 26. Such control can enable good electron beam optics to be achieved. Specifically, good electron beam optics from field emitter tips can be achieved if the tips are neither too close to one another, nor too far apart. It is desirable to have a large number of emitter tips per pixel to enhance current and brightness as well as provide redundancy for robustness and lifetime. A trade-off is that emitter tips are 11 preferably far enough away from each other so that they do not adversely effect one another's electric field.

In the above-described processing sequence, it was specified that layer 18 preferably comprises silicon dioxide. The utilization of silicon dioxide for layer 18 can be advantageous over other materials in that it is found that organic microspheres (such as, for example, polystyrene beads) are better transferred to a silicon substrate (such as a polysilicon layer 16) when the particles are in apertures formed in silicon dioxide, rather than in apertures formed in other materials. A possible mechanism for the better transfer from apertures formed in silicon dioxide is that silicon dioxide can carry a negative charge which can repel negative charges of particles. Such repulsion can assist in alleviating adhesion of the particles to the silicon dioxide, and ease transfer of the particles to an underlying layer 16.

Another possible mechanism for the improved transfer from apertures formed in silicon dioxide relative to apertures formed in other materials is that the other materials may "stick" to the particles. For instance, if layer 18 comprises photoresist, it can be relatively tacky compared to silicon dioxide. Accordingly, the organic particles can disadvantageously stick to the photoresist layer 18 and be relatively difficult to transfer to an underlying silicon-comprising layer 16.

Although silicon dioxide can be a preferred material for layer 18, it is to be understood that the invention is not to be limited to any particular material within layer 18 except to the extent that such is specifically expressed in the claims that follow.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of forming a semiconductor device, comprising:

forming a layer over a substrate;

forming a plurality of openings extending into the layer;

collecting particles within the openings; and using the collected particles as a mask during etching of the underlying substrate to define features of the semiconductor device.

2. The method of claim 1 wherein the layer comprises silicon dioxide.

3. The method of claim 1 wherein the layer comprises photoresist.

4. The method of claim 1 wherein the particles comprise microspheres.

5. The method of claim 1 wherein the particles comprise microspheres having an average diameter of from about 1 to about 2 microns.

6. The method of claim 1 wherein the substrate comprises polysilicon, wherein the layer comprises silicon dioxide, and wherein the openings extend through the silicon dioxide layer to the substrate; the method comprising removing the silicon dioxide layer after collecting the particles and before etching the substrate.

7. A method of forming a semiconductor device, comprising:

forming a silicon dioxide layer over a conductively doped polysilicon material;

forming a number of openings extending through the silicon dioxide layer and to the underlying polysilicon material;

depositing a number of particles on the silicon dioxide layer;

collecting at least some of the particles within the openings;

removing the silicon dioxide to leave the collected particles over the polysilicon material; and using the collected particles as a mask during etching of the polysilicon material to define features of the semiconductor device.

8. The method of claim 7 wherein the depositing the particles comprises applying a suspension of the particles to a surface of the silicon dioxide, and wherein the collecting comprises mechanically urging the particles into the openings.

9. The method of claim 7 wherein the depositing the particles comprises applying a suspension of the particles to a surface of the silicon dioxide, and wherein the collecting comprises squeegeeing the particles into the openings.

10. The method of claim 7 wherein the forming a plurality of openings extending into the silicon dioxide layer comprises:

forming a patterned layer of photoresist over the silicon dioxide layer; and transferring a pattern from the photoresist to the silicon dioxide layer.

11. The method of claim 7 wherein the particles comprise microspheres.

12. A method of forming a field emission display, comprising:

forming a silicon dioxide layer over a conductive substrate;

forming a plurality of openings extending into the silicon dioxide layer;

depositing particles on the silicon dioxide layer;

collecting the particles within the openings;

while using the collected particles as a mask, etching the conductive substrate to form a plurality of emitters from the conductive substrate; and providing a luminescent display screen spaced from said emitters in an orientation whereby it can be impacted by electrons emitted by the emitters.

13. The method of claim 12 further comprising after collecting the particles in the openings and before utilizing the collected particles as a mask, melting the particles.

14. The method of claim 13 further comprising removing the silicon dioxide layer before melting the particles.

15. The method of claim 12 further comprising configuring the apertures relative to the particle dimensions such that no more than one particle is collected within any individual opening.

16. The method of claim 12 wherein the particles comprise microspheres.

17. The method of claim 12 wherein the particles comprise microspheres having an average diameter of from about 1 to about 2 microns.

18. The method of claim 12 wherein the substrate comprises silicon, wherein the openings extend through the silicon dioxide layer to the substrate, and further comprising removing the silicon dioxide layer after collecting the particles and before etching the substrate.

19. The method of claim 12 wherein the substrate comprises silicon, wherein the openings extend through the silicon dioxide layer to the substrate, and further comprising removing the silicon dioxide layer after collecting the particles and before etching the substrate, the removing comprising dry etching utilizing at least one of $CF_4$ and $CHF_3$.

20. The method of claim 12 wherein the forming a plurality of openings extending into the silicon dioxide layer comprises:

forming a patterned layer of photoresist over the silicon dioxide layer; and transferring a pattern from the photoresist to the silicon dioxide layer.

21. The method of claim 12 wherein the forming a plurality of openings extending into the silicon dioxide layer comprises:

forming a patterned masking layer over the silicon dioxide layer; and transferring a pattern from the masking layer to the silicon dioxide layer with a buffered oxide etch.

22. The method of claim 12 wherein the substrate comprises conductively doped polysilicon.

23. The method of claim 12 wherein the depositing the particles comprises applying a suspension of the particles to a surface of the silicon dioxide, and wherein the collecting comprises mechanically urging the particles into the openings.

24. The method of claim 12 wherein the depositing the particles comprises applying a suspension of the particles to a surface of the silicon dioxide, and wherein the collecting comprises squeegeeing the particles into the openings.

* * * * *

UNITED STATES PATENT AND TRADEMARK OFFICE

CERTIFICATE OF CORRECTION

PATENT NO. : 6,338,938 B1 
DATED : January 15, 2002
INVENTOR(S) : Eric A. Lahaug It is certified that error appears in the above-identified patent and that said Letters Patent is hereby corrected as shown below:

<u>Column 1,</u>
Line 20, replace "emission 11 display" with -- emission display --

<u>Column 2,</u>
Line 62, replace "colloidal 11 particle" with -- colloidal particle --

<u>Column 4,</u>
Line 8, replace "are 11 preferably" with -- are preferably --

Signed and Sealed this

Fifth Day of November, 2002

*Attest:*

JAMES E. ROGAN

*Attesting Officer* *Director of the United States Patent and Trademark Office*